United States Patent [19]
Battlogg et al.

[11] Patent Number: 5,816,355
[45] Date of Patent: Oct. 6, 1998

[54] POWER ASSIST APPARATUS FOR A MANUALLY OPERATED VEHICLE

[75] Inventors: Christian I. Battlogg, Thousand Oaks; Richard A. Mayer, Saugus, both of Calif.

[73] Assignee: Electric Bicycle Company, Pacific Palisades, Calif.

[21] Appl. No.: 523,193

[22] Filed: Sep. 5, 1995

[51] Int. Cl.$^6$ ................................................. B62D 61/02
[52] U.S. Cl. ........................ 180/221; 180/220; 180/205; 180/298; 180/342
[58] Field of Search ................................... 180/220, 221, 180/205, 65.1, 298, 342, 65.2, 222

[56] References Cited

U.S. PATENT DOCUMENTS

| | | |
|---|---|---|
| 627,066 | 6/1899 | Schnepf . |
| 2,578,886 | 12/1951 | Isherwood et al. ..................... 180/221 |
| 3,431,994 | 3/1969 | Wood, Jr. . |
| 3,841,428 | 10/1974 | Bialek . |
| 3,878,910 | 4/1975 | Walker, Jr. . |
| 3,891,044 | 6/1975 | Tiede . |
| 3,905,442 | 9/1975 | O'Neill . |
| 3,915,250 | 10/1975 | Laden et al. . |
| 3,921,745 | 11/1975 | McCulloch et al. . |
| 3,961,678 | 6/1976 | Hirando et al. . |
| 3,966,007 | 6/1976 | Havener . |
| 3,978,936 | 9/1976 | Schwartz . |
| 4,081,048 | 3/1978 | Hendricks . |
| 4,113,043 | 9/1978 | Palmer .................................... 180/221 |
| 4,143,730 | 3/1979 | Desmond . |
| 4,175,629 | 11/1979 | Kalajzich ................................ 180/220 |
| 4,410,060 | 10/1983 | Cunard .................................... 180/205 |
| 4,541,500 | 9/1985 | Gelhard ................................... 180/205 |
| 4,579,188 | 4/1986 | Facer ...................................... 180/211 |
| 4,637,274 | 1/1987 | Goldenfeld ............................... 74/625 |
| 4,871,042 | 10/1989 | Hsu et al. ............................... 180/220 |
| 5,226,501 | 7/1993 | Takata .................................... 180/206 |
| 5,237,263 | 8/1993 | Gannon ................................... 323/288 |
| 5,242,028 | 9/1993 | Murphy et al. .......................... 180/220 |

*Primary Examiner*—J. J. Swann
*Assistant Examiner*—Gary Savitt
*Attorney, Agent, or Firm*—Jack C. Munro

[57] ABSTRACT

A power assist apparatus which includes a battery powered motor which is mounted on a manually operated vehicle such as a bicycle, which is to be selectively usable by the rider of the bicycle to not only assist in the manual operation of the bicycle but can be used as a sole source of operation of the bicycle. The power assist apparatus is normally fixedly mounted on the bicycle and is carried with that bicycle at all times. The power assist apparatus includes a housing and exteriorly mounted on that housing is a handle. Movement of the handle to various positions locates the power assist apparatus in either a disengaged position relative to a support wheel of the bicycle or to an engaged position relative to the support wheel of the bicycle. The engaged position actually includes a further engagement position that the handle can be moved to which is to be used when the bicycle is being operated in a wet environment to insure positive frictional engagement between a drive wheel of the power assist apparatus and the support wheel of the bicycle to which it is connected.

9 Claims, 8 Drawing Sheets

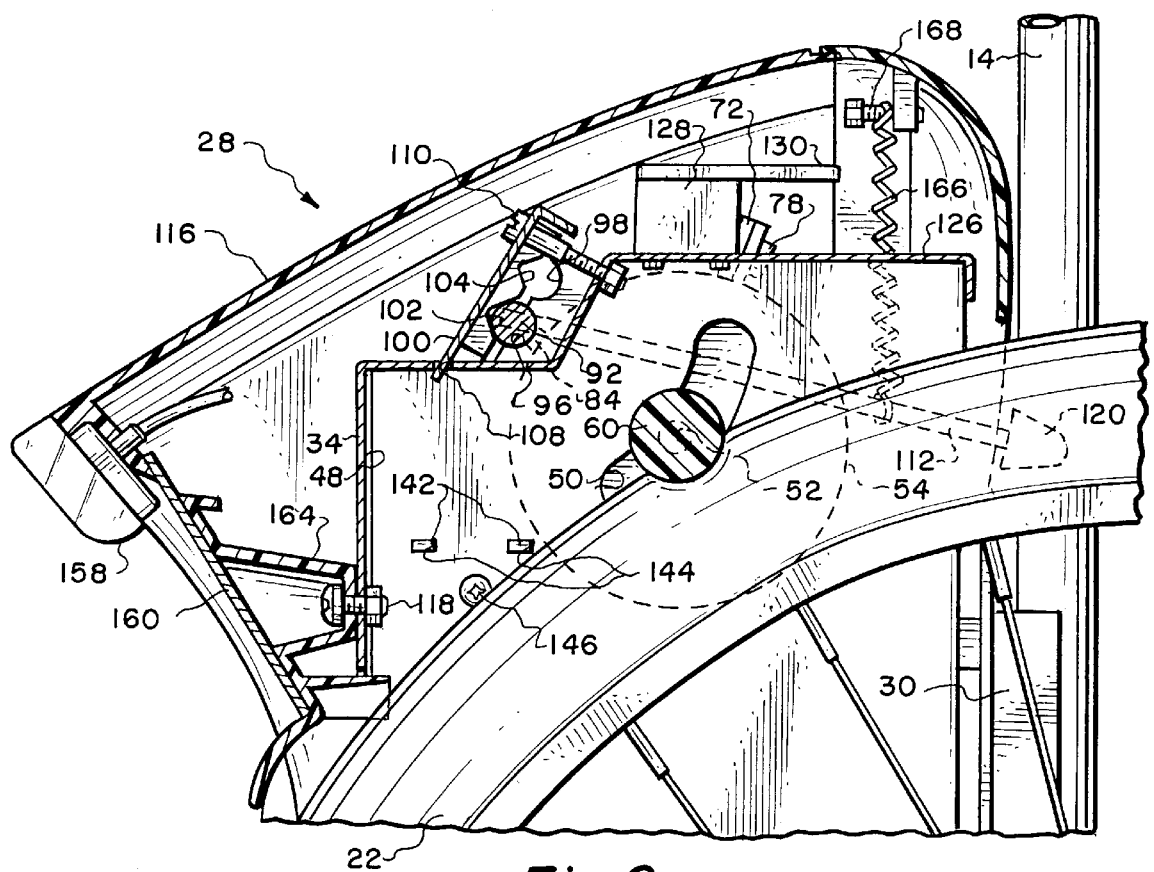
Fig. 8.
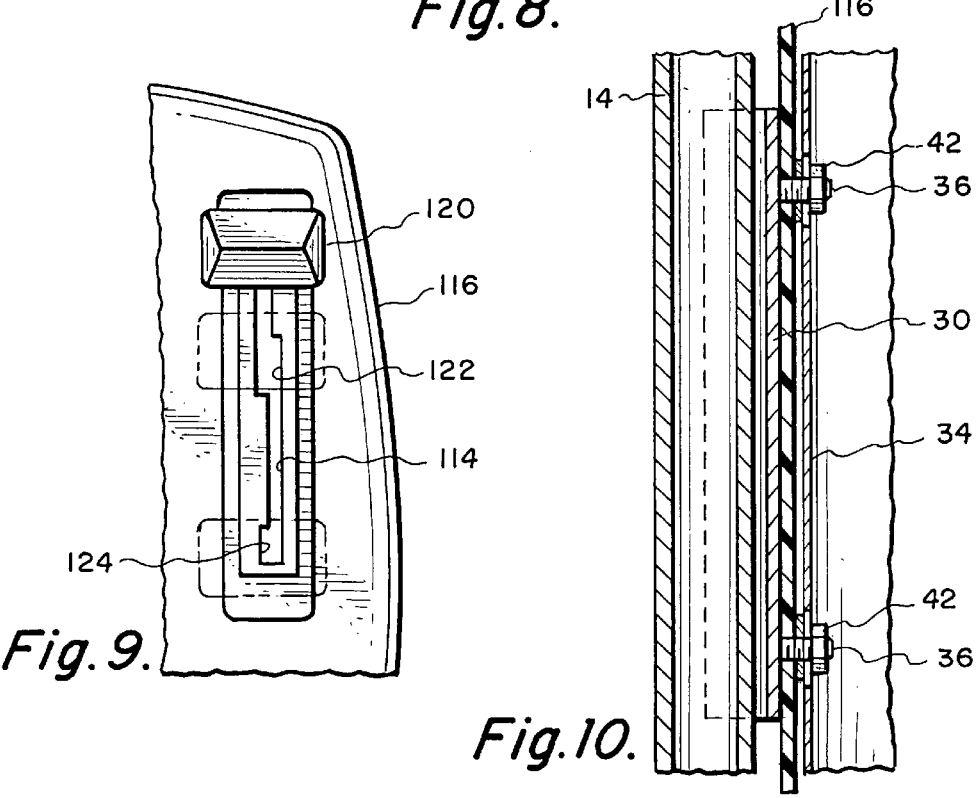
Fig. 9.
Fig. 10.

POWER ASSIST APPARATUS FOR A MANUALLY OPERATED VEHICLE

BACKGROUND OF THE INVENTION

1) Field of the Invention

This invention relatives to an electric battery powered assist apparatus for a manually operated vehicle and more particularly to a new and novel construction of power assist apparatus.

2) Description of the Prior Art

The subject matter of this invention has been found to be particularly useful in conjunction with bicycles. However, it is within the scope of this invention that it could be used in conjunction with other manually operated vehicles such as tricycles, scooters and the like.

Electric powered bicycles are well known. Electric powered bicycles generally incorporate an electric motor powered by a rechargeable battery. The electric motor is connected to a drive wheel which frictionally engages a support wheel of the bicycle. Operation of the drive wheel adds to the manual movement of the bicycle. The prior art power assist devices for bicycles have offered solutions toward significantly powering a bicycle with a motor while permitting usage of the bicycle in a normal manner. These prior art solutions have, however, been mechanically and/or cosmetically complex. Past designs have been inclined toward adding mechanical hardware rather than toward the utilization of existing bike hardware. Extra gears, gear boxes, chains and sprockets are often featured conspicuously on such designs. Also, motor accessories such as throttles, belts, and shields are also commonly featured. As a result, these designs have compromised the bicycles on which they are mounted rather than enhance the bicycle. There has been little or no effort toward designing an attractive unit that can be quickly and easily installed on an existing bicycle and that presents an attractive appearance to the bicycle.

Also, air pollution has become an increasing problem due in part to the increase in the use of automobiles and motorcycles. Air pollution is particularly acute in cities. It has been known that one way to improve air quality is to decrease the usage of automobiles and motorcycles. People use automobiles and motorcycles not only for longer trips but for short-term travel close to home such as "running to the store". One way to decrease air pollution is to use a bicycle when making these short trips in close proximity to one's home. However, frequently these short trips require that the operator of the bicycle pedal the bike up one or more hills. This is generally a sufficient deterrent for most people to not use the bicycle when making such trips. However if a power assist device was incorporated in conjunction with the bicycle then possibly a user may be more inclined to use a bicycle when making such trips since the overall effort to be expended by the operator would be decreased.

The prior art power assist devices for bicycles mount the battery in one location in conjunction with the bicycle and then mount the drive motor in another location. The result is the overall look of the bicycle is affected and actually becomes unattractive. There is a need to construct a power assist device for a bicycle which is manufactured in a single compact unit which can be mounted in conjunction with the bicycle and produce a relatively attractive overall structure.

In the past the designing of a practical electric propulsion system for a bicycle has proven to be a formidable task. This task is evidenced by the absence of electric powered bicycles in commercial production at this time. An electrically operated bicycle, which effectively competes against other forms of transportation, remains lacking.

Prior art power assist devices for bicycles suffer also from other disadvantages which are as follows: Power assist devices affect the standard functions of a bicycle when used in a nonmotorized manner. Power assist devices have a multitude of conspicuous parts that are not easy to remove from the bicycle prohibiting the bicycle to be easily changed to a standard manually operated bicycle. Also such prior art power assist devices are in most cases excessively expensive thereby precluding their widespread usage.

SUMMARY OF THE INVENTION

A power assist apparatus for a manually operated vehicle such as a bicycle, which incorporates an attractive housing which is installed with the rear support wheel of the bicycle with this installation being permanent. It is deemed to be within the scope of this invention to modify the power system of this apparatus to be disengagable from the bicycle and reengagable at the whim of the user. The power assist apparatus of this invention includes a main supporting frame with a motor assembly being pivotally mounted on this main supporting frame. Mounted in conjunction with the main supporting frame are batteries which supply the electrical power to the motor assembly. The motor assembly connects to a drive wheel with both the motor assembly and the drive wheel being movable in conjunction with the main supporting frame. Normally this movement of the motor assembly and the drive wheel is accomplished by means of a handle with this handle protruding from the exterior housing of the power assist apparatus so as to be readily accessible by the user of the bicycle. Movement of the handle to a first position will cause the drive wheel of the apparatus is to be located in a spaced relationship from the support wheel of the bicycle. The handle can then be moved to a second position which will then place the drive wheel in an initial engaging position with the support wheel of the bicycle with this initial engaging position being used when the bicycle is being operated in a dry environment. The handle can also be moved to a third position which locates the drive wheel in a more secure position with the support wheel of the bicycle with this third position being used in a wet environment. Activation of the power assist apparatus by means of a switch will then result in movement of the bicycle.

The primary objective of the present invention is to provide a vehicle of transportation for work and recreation that can be used by most people without adding to the smog which is caused by combustion engines, especially in urban areas.

It is another object of the present invention to provide a driving engagement with a support wheel to the bicycle that is assumes different position, one position for a dry environment and another position for a wet environment with the position for the wet environment being a more positive type of engagement than in the position for the dry environment.

It is a further objective of the present invention to provide a power assist apparatus for a bicycle which utilizes a plurality of electric motors which propel the bicycle by frictional engagement of a drive wheel with a support tire of a support wheel of the bicycle.

A further objective of the present invention is to construct a power assist apparatus for a bicycle which is composed of few parts, is of lightweight construction and can be economically manufactured, yet which is extremely efficient and durable in operation and requires a minimum of maintenance.

Another objective of the present invention is to construct the power assist apparatus where the weight of the apparatus is located as low as possible in conjunction with the bicycle so as to eliminate an unbalanced high center of gravity which would make the bicycle difficult to operate.

BRIEF DESCRIPTION OF THE DRAWINGS

FIG. 8 is a longitudinal cross-sectional view similar to FIG. 7 but showing the power assist apparatus in a further activated position which is to be used in a wet environment;

FIG. 9 is a front view of a portion of the power assist apparatus of the present invention taken along line 9—9 of FIG. 3 showing the handle arrangement that is incorporated in conjunction with the apparatus that is to be manually moved to locate the apparatus in its deactivated position or its engaged positions;

FIG. 10 is a cross-sectional view showing more clearly the mounting arrangement of the power assist apparatus on the two-door frame of the bicycle;

DETAILED DESCRIPTION OF THE PREFERRED EMBODIMENT

Figure 1:
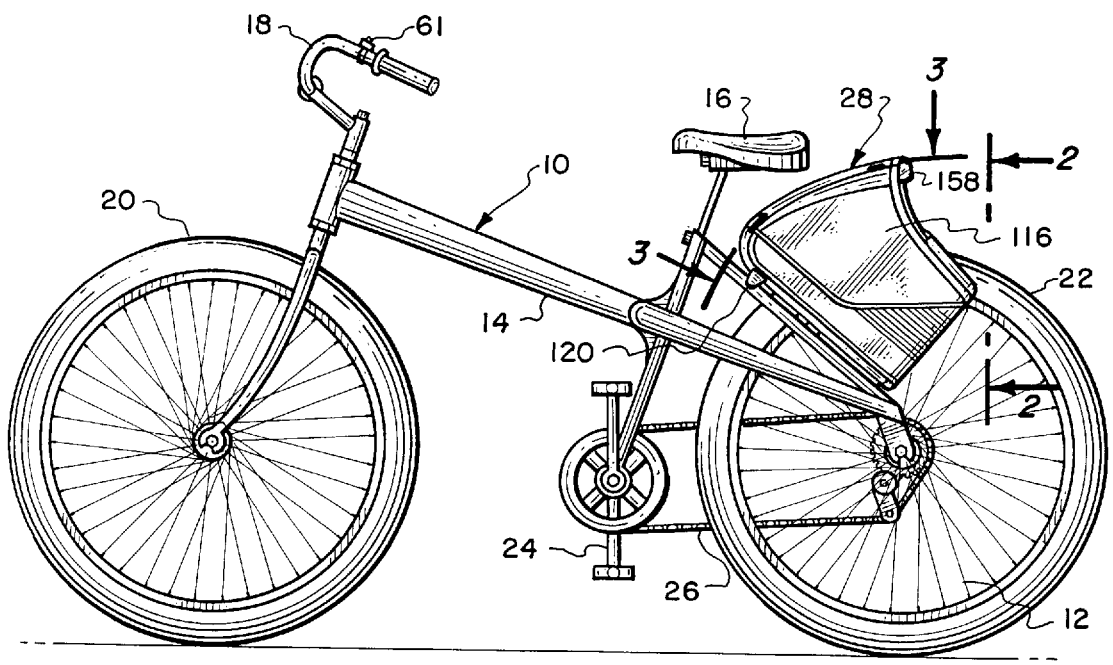
FIG. 1 is a side elevational view of a bicycle upon which has been mounted the power assist apparatus of the present invention.
Figure 2:
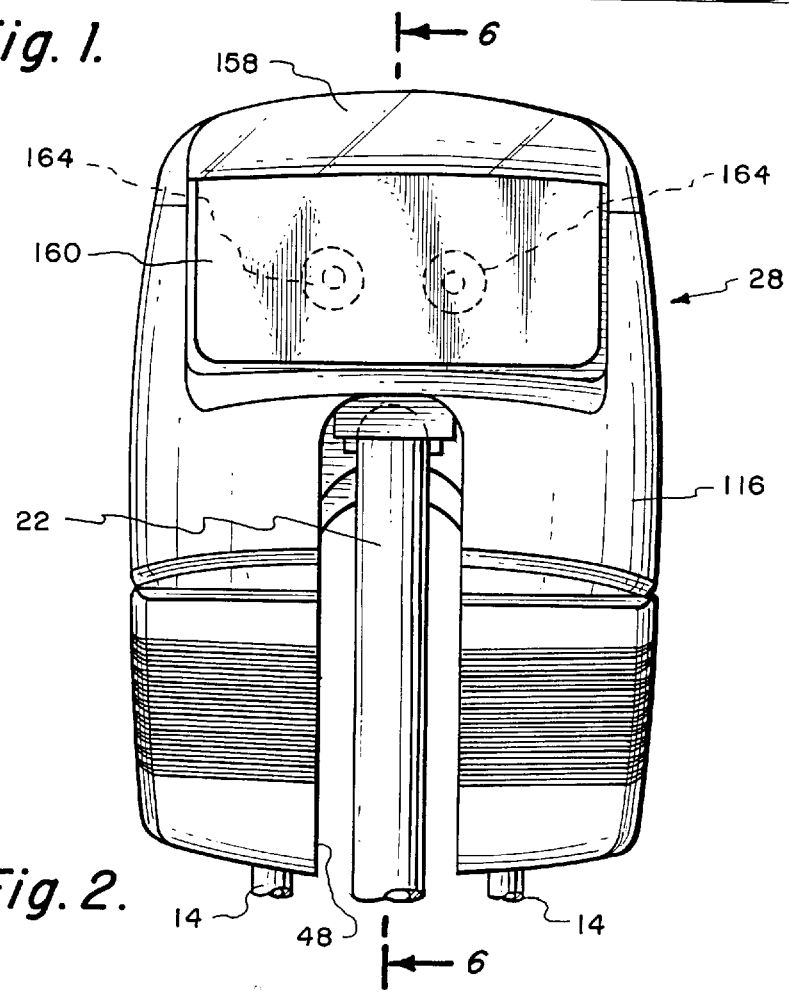
FIG. 2 is a rear directional view of the power assist apparatus of the present invention taken along line 2—2 of FIG. 1.
Figure 3:
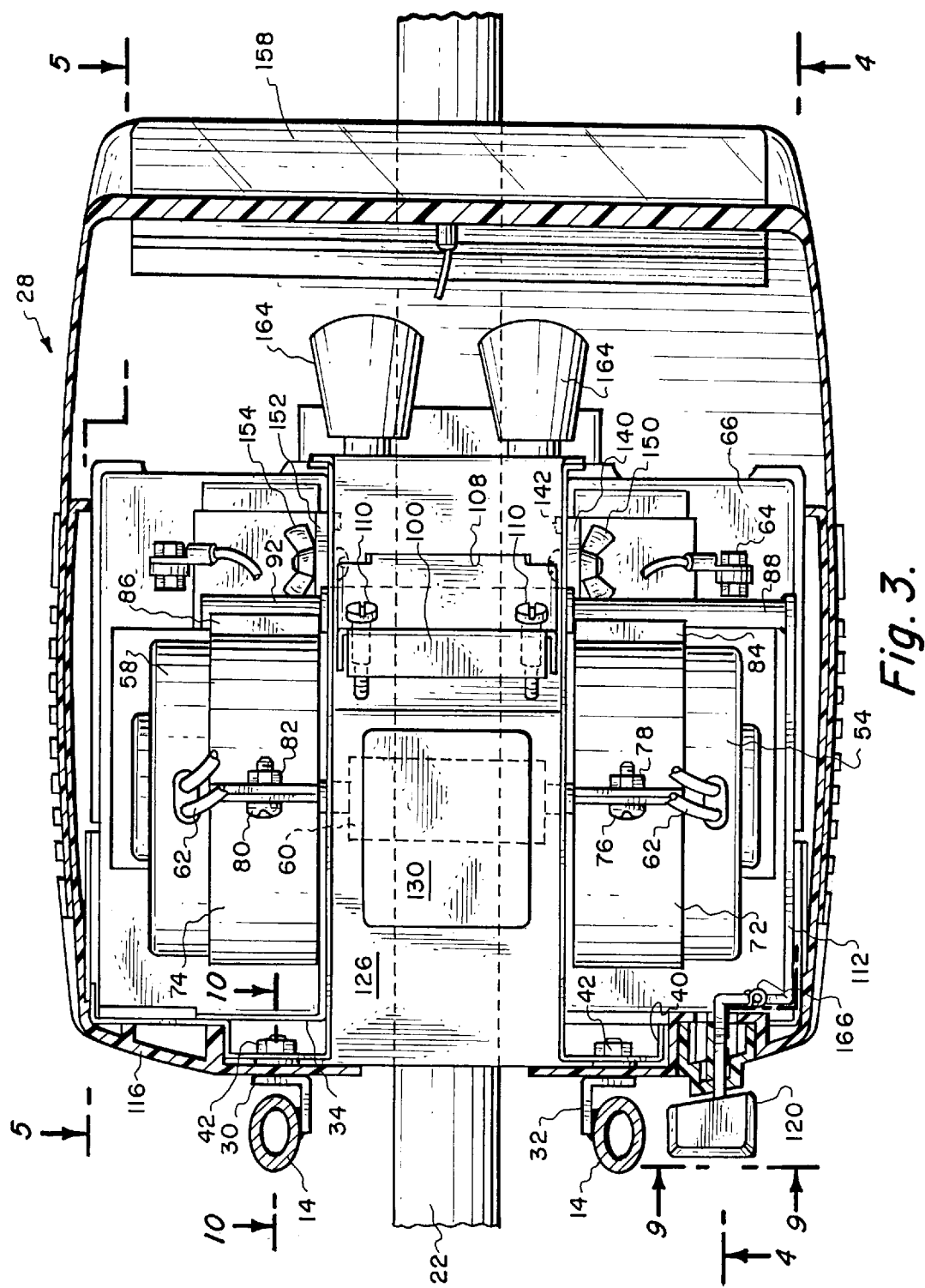
FIG. 3 is a top view, partially in cross section, of the power assist apparatus of the present invention taken along line 3—3 of FIG. 1.

Referring particularly to the drawings there is shown a manually operated vehicle in the form of a bicycle 10 which has a frame composed of a plurality of tubular members 14, a seat 16, a handlebar 18, a front support wheel 20 and a rear support wheel 22. A pedal assembly 24 is to be manually operated by the user of the bicycle 10 which operates through a chain 26 to rotate a sprocket 12 mounted on the rear support wheel 22. The power assist apparatus 28 of this invention is to be fixedly mounted on a pair of the tubular members 14. It is to be understood that there will be two tubular members 14, one located on each side of the rear support wheel 22.

One leg of an L-shaped bracket is welded to one tubular member 14 located on one side of the support wheel 22. One leg of a similar L-shaped bracket 32 is welded to tubular member 14 located on the opposite side of the support wheel 22. The remaining legs of each of the brackets 30 and 32 include threaded bolts 36. The threaded bolts 36 of the bracket 32 are each conducted through respective oversized holes 38 formed within side flange 40 of a main supporting frame 34. The bolts 36 are then to be connected to conventional fastening nuts 42 which secure in position the main supporting member 34 relative to the bracket 32. In a similar manner the threaded bolts 36 of the bracket 30 connect with oversized holes 44 of the side flange 46. Both side flanges 40 and 46 are fixedly secured to the main supporting member 34. The reason for the oversized holes 38 and 44 is to permit vertical movement of the main supporting frame 34 relative to the support wheel 22. This vertical movement is so as to provide for individual adjustment of each main supporting frame 34 on each bicycle 10.

The basic configuration of the main supporting frame 34 is that of a U-shape forming an internal compartment 48. Within that internal compartment 48 is located the support wheel 22. The portion of the main supporting frame 34 that is located on each side of the support wheel 22 in essence can be defined as opposing sidewalls. Included within each of these sidewalls is an arcuate slot 50. Each of the slots 50 are the same shape and the same size. One of the slots 50 has an output shaft 52 from a motor (not shown) contained within motor housing 54 being conducted there through. Through the other of the slots 50 there is located the output shaft 56 of a motor (not shown) contained within motor housing 58. It is to be noted that the arcuate slot 50 is of a significantly greater width than the output shaft 52 as is also the slot 50 for the shaft 56. The reason for this is that when the support wheel 22 incurs road shock, this road shock will cause substantial vertical movement of the drive wheel 60 to which the output shafts 52 and 56 are fixedly secured. The oversize configuration of the slots 50 is necessary to permit this vertical movement.

The drive wheel 60 is normally constructed of a material having a high coefficient of friction. Drive wheel 60 could be constructed of a rubber type material or could be constructed to be of a metallic material with the outer surface of the drive wheel 60 being ferruled or otherwise roughened so as to obtain a frictional grabbing type of connection with the generally rubber type of tire included within the support wheel 22. This tire will deflect by pressure of the drive wheel 60 against the tire.

The motor housing 54 and 58 are basically identical and each includes electrical connecting wires 62. The wires 62 of the motor from motor housing 54 connect to the terminals 64 of a battery 66. In a similar manner the wires 62 of the motor contained within motor housing 68 are electrically connected to the terminals 68 of a battery 70. The batteries 66 and 70 are basically identical and generally comprise a twelve volt battery.

The only difference between the motor housings 54 and 58 is that the motors contained therein rotate their output shafts 52 and 56 in opposite directions. This is so that when the motor housings 54 and 58 are located in a facing relationship to each other which is their mounting position, the output of the shafts 52 and 56 will be added and will combine through the drive wheel 60 to rotate the tire of the support wheel 22 in a counterclockwise direction as shown in FIG. 1. This means that the drive wheel 60 is rotated clockwise. The motor housing 54 is supported by means of a clamping band 72 with the motor housing 58 being supported by means of a clamping band 74. Clamping band 72 terminates in a pair of spaced-apart ends which are connected together by a bolt fastener 76 and when tightened by means of nut 78 securely mounts the band 76 onto the motor housing 54. In a similar manner the flanged spaced-apart ends of the clamping band 74 are connected together by means of the fastener 80 which is to function to tighten secure the clamping band 74 onto the motor housing 58 by means of the nut 82. The clamping band 72 has a strip 84 mounted thereon. In a similar manner the clamping band 74 has a strip 86 fixedly mounted thereon. Usually the strips 84 and 86 have an exterior channel-shaped surface. The exterior channel-shaped surface of the strip 84 is to manually conect with, and be fixedly secured, as by welding, to the end 88 of a mounting rod 90. The channel-shaped surface of the strip 86 manually connects with and is fixed to end 92 of the mounting rod 90.

In between the ends 88 and 92 there is located an enlarged cylindrical section 94. This enlarged cylindrical section 94 is to either rest within aligned recesses 96 or aligned recesses 98 of the main supporting frame 34. The enlarged center section 94 is shown located within the aligned recesses 96. The aligned recesses 96 are to be used when a conventionally sized tire is used on the support wheel 22. However, if the tire that is used is larger than normal and has a greater depth, it may be necessary to mount the enlarged center section 94 within the aligned recesses 98. In other words, the position of the drive wheel 60 can be initially adjusted at the time of installation depending upon the particular type of bicycle that the power assist apparatus 28 of this invention is being mounted upon.

In order to maintain the established position of the enlarged center section 94 within either aligned recesses 96 or 98, there is utilized retaining member 100. The inner surface of retaining member 100 has notches 102. These notches 102 are to be located against the enlarged center section 94 when the enlarged center section 94 is located within the aligned recesses 96. The inner surface of the retaining member 100 also includes a second set of aligned notches 104 whose function would be to engage with the enlarged center section 94 when such is located within the aligned recesses 98. The lower edge 106 of the retaining member 100 is to be locatable within a slot 108 formed within the main supporting frame 34. The upper end of the retaining member 100 connects with a pair of bolt fasteners 110 which are used to secure the retaining member 100 to the main supporting member 34. This holds the established position of the mounting rod 90 but permits the mounting rod 90 to be pivoted relative to the main supporting frame 34 and the retaining member 100.

Figure 4:
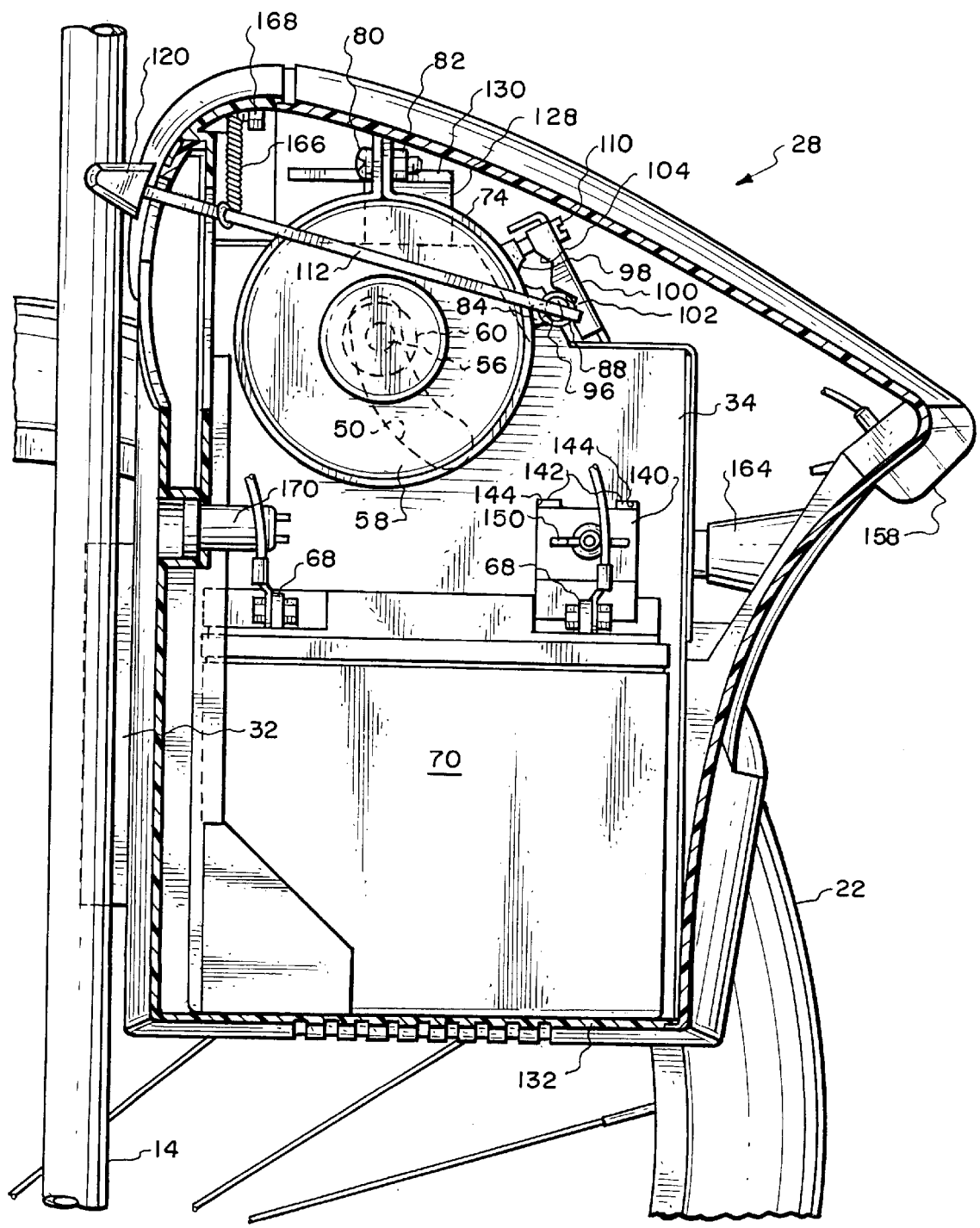
FIG. 4 is a longitudinal cross-sectional view through the power assist apparatus of the present invention taken along line 4—4 of FIG. 3 showing the power assist apparatus in the deactivated position.
Figure 5:
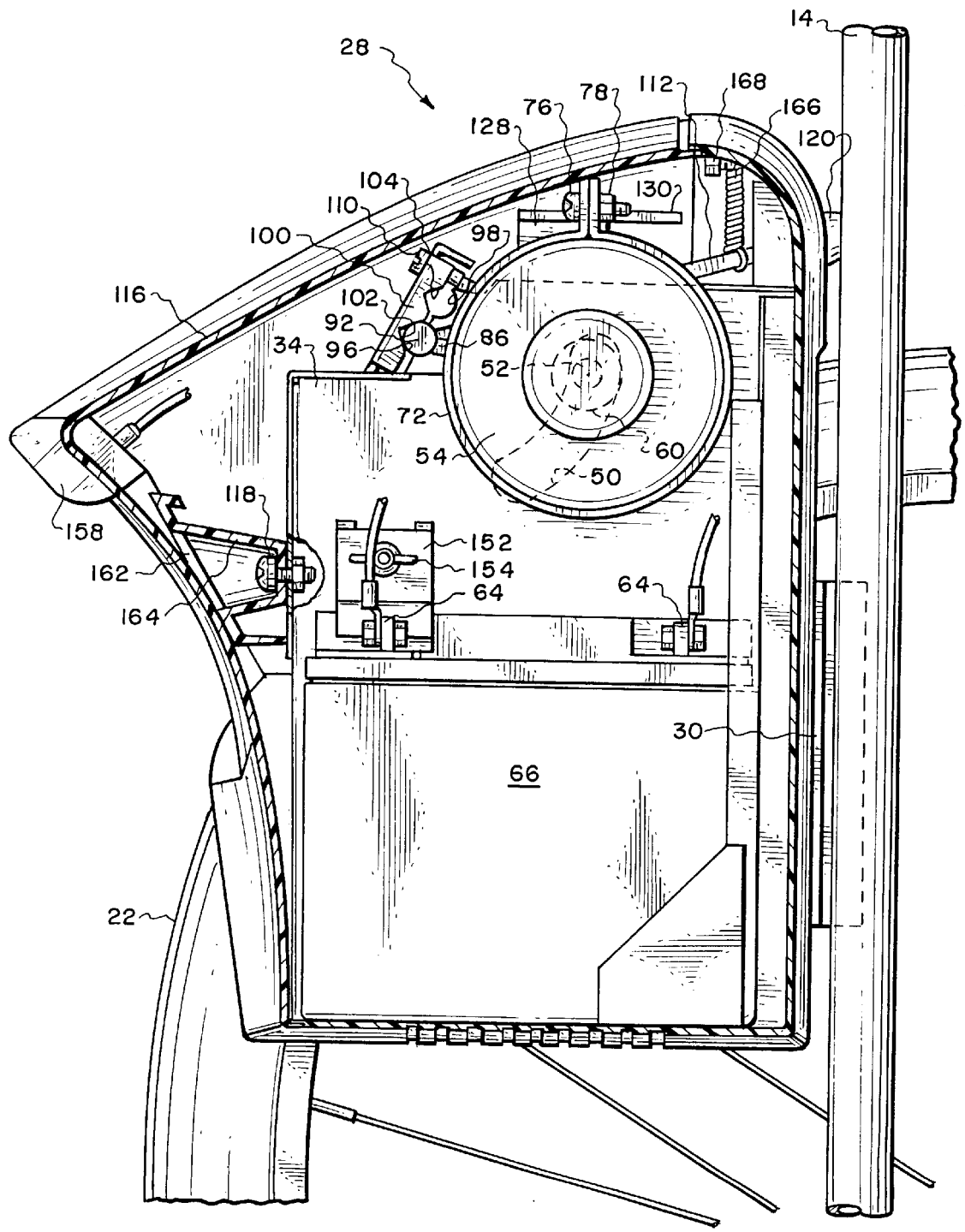
FIG. 5 is a longitudinal cross-sectional view taken in a direction opposite to that of FIG. 4 and taken along line 5—5 of FIG. 3 again showing the power assist apparatus in the deactivated position.
Figure 6:
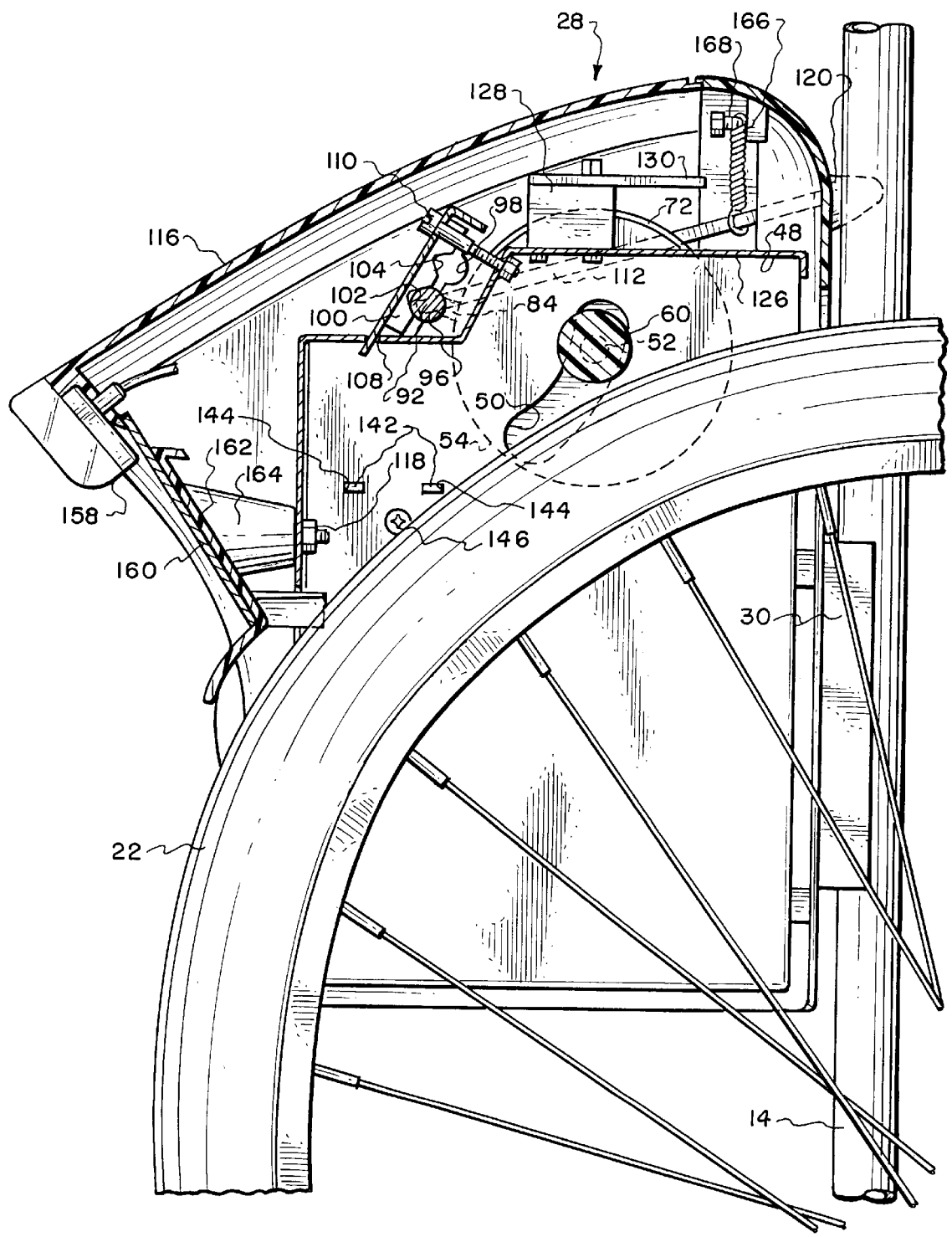
FIG. 6 is a longitudinal cross-sectional view through the power assist apparatus of the present invention taken along line 6—6 of FIG. 2 again showing the power assist apparatus in the deactivated position.

Fixedly mounted to the outer end of the end 88 is an arm 112. This arm 112 extends through a slot 114 formed within the housing cover 116. The housing cover 116 will comprise generally a couple parts of thin sheet material which have been specially configured to surround the internal components of the power assist apparatus 28 of this invention. The housing cover 116 is mounted in an appropriate location by bolt fasteners (not shown). A handle 120 is fixedly mounted to the outer end of the arm 112. The handle 120 is to be manually movable which will move the arm 112 within the slot 114. The arm 112 is capable of occupying the uppermost position as shown in FIGS. 4, 6 and 9 of the drawings or the arm 112 is capable of connecting with an intermediate notched section 122 of the slot 114. When in this position, the arm 112 is in the position shown in FIG. 7 of the drawings. The arm 112 can also be located in the lower notched section 124 of the slot 114 and when in this position, the arm 112 is in the position shown in FIG. 8 of the drawings.

The main supporting frame 34 has a top plate 126. Fixedly mounted on the top plate 126 is a heat sink 128. Mounted on the heat sink 128 is a printed circuit board 130. The printed circuit board 130 is to include appropriate electronics to provide for operation at different speeds of the motors contained within motor housings 54 and 58, as well as any other electrical requirements that would be necessary in order to operate the power assist apparatus 28 of this invention.

Extending from one sidewall of the main supporting frame 34 is a bottom flange 132. A similar bottom flange 134 extends from the opposite sidewall of the main supporting frame 34. The bottom flange 132, the side flange 40 and the one sidewall of the main supporting frame 34 cooperate together to form a battery compartment 136. It is within that battery compartment 136 that the battery 70 is located. A similar battery compartment 138 is formed between the bottom flange 134, the side flange 46 and the opposite sidewall of the main supporting frame 34. Battery 66 is located within compartment 138 It is to be understood that the bottom flanges 132 and 134 are either formed integrally with the main supporting frame 34 or are fixedly secured thereto as to by welding or other similar type of securement.

When the battery 66 is located in position, an L-shaped battery securing bracket 140 connects with the upper edge of the battery 66. The bracket 140 has fingers 142 which connect with holes 144 formed within the sidewall of the main supporting frame 34. Fixedly mounted within the sidewall is a threaded bolt 146 which is to be conducted through hole 148 of the securing bracket 140. A wing nut 150 is to be secured to the bolt 146 and functions to securely hold in place the securing bracket 140 which secures in a fixed location the battery 70. It is to be understood that this securing bracket 140 must be removed when it is desired to replace the battery 70. It is to be understood that for the battery 66 there is a similar securing bracket 152 which is mounted in a similar manner to the opposite sidewall of the main supporting frame 34 and is secured in position by a wing nut 154. The wing nut 154 connects with the threaded bolt 156 which is fixedly mounted within the other sidewall of the main supporting frame 34.

The housing cover 116 is to include a reflector and light 158 which is electrically connected through the printed circuit board 130 and be operated by the batteries 66 and 70. Just beneath the reflector and light 158 is a license plate 160. This license plate 160 is mounted onto mounting plate 162. The mounting plate 162 is integrally attached to cavity members 164. The cavity members 164 are secured by bolt fasteners 118 to the main supporting frame 34.

A coil spring 166 connects between the arm 112 and pin 168. The pin 168 is fixedly mounted to the interior wall of the housing cover 116. It is the function of the coil spring 166 to exert a continuous bias on the arm 112 tending to locate the arm 112 in its uppermost position which is shown in FIG. 9. Therefore, moving of the arm 112 by means of handle 120 is always against the bias of the coil spring 166.

Mounted within the housing cover 116 is a charger socket 170. The charger socket 170 is to be connectable with a charger plug (not shown) from a conducting wire (not shown). Electrical energy to be supplied from an exterior source through the charger plug and into the charger socket and through the printed circuit board 130 to function to recharge the batteries 66 and 70.

Figure 7:
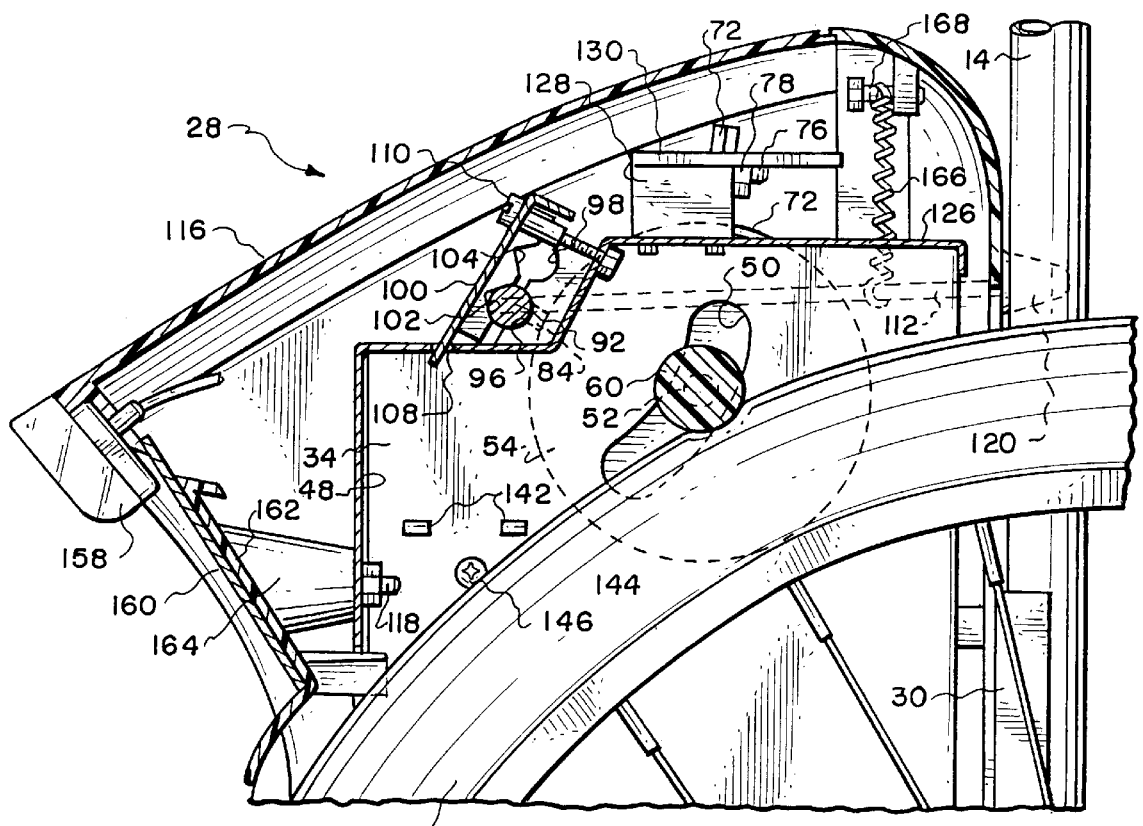
FIG. 7 is a longitudinal cross-sectional view similar to FIG. 6 but showing the power assist apparatus in an activated position with this activated position to be used in a dry environment.
Figure 11:
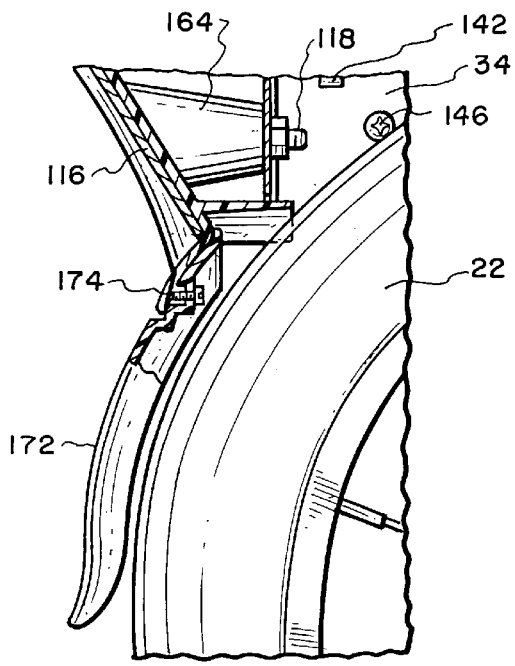
FIG. 11 is a cross-sectional side elevational view of a portion of the power assist apparatus showing the inclusion of a fender to be located in conjunction with a support wheel of the bicycle.
Figure 12:
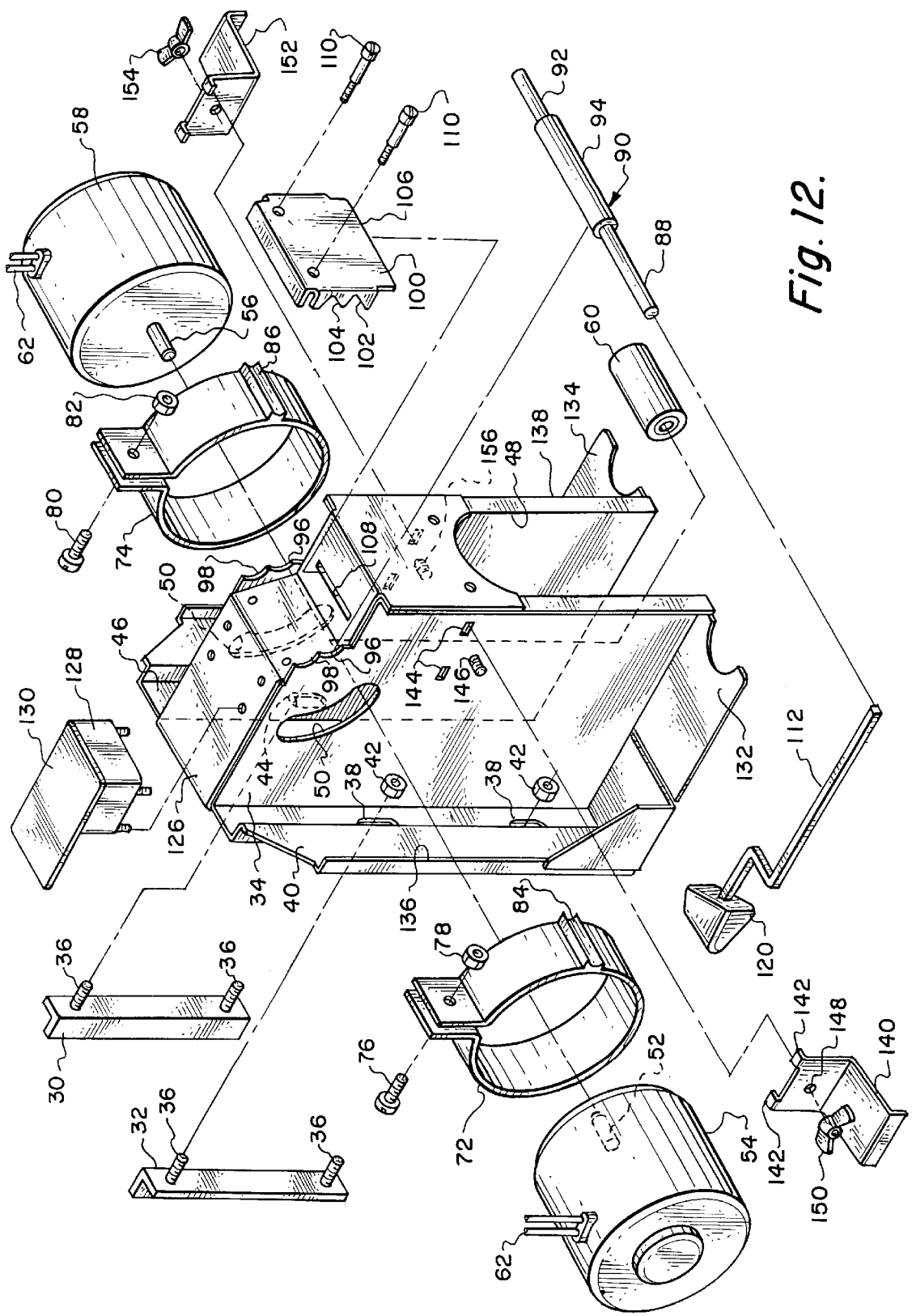
FIG. 12 is an exploded isometric view of the power assist apparatus of the present invention.

If the bicycle 10 is intended to be used as a conventional bicycle and be solely operated by means of force being supplied by the user through the pedal assembly 24, the handle 120 is to be located in the upper position as shown in FIGS. 1, 4, 6 and 9 which will position the drive wheel 60 at a spaced location from the tire of the support wheel 22. At this particular time a switch 61 which will normally be mounted on the handlebar 18 will be located in the "Off" position. Let it be assumed that the user wishes to engage the power assist apparatus 28. The user will move the handle 120 to the intermediate notch section 122 which will cause the drive wheel 60 to be moved in contact with the tire of the support wheel 22 deflecting somewhat the rubber tire of the support wheel 22. This position is shown in FIG. 7 of the drawings. This would be the position that would be used if the conditions that the bicycle 10 is being operated within are dry. If the conditions are wet, the user is to manually move the handle 120 to the lowermost section 124 with this position being shown in FIG. 8 of the drawings. It can be seen that the drive wheel 6o depresses further into the tire of the support wheel 122 thereby obtaining increased traction in the wet environment. With the drive wheel 60 engaged with the tire, the user will remount the bicycle 10 and begin movement manually. The user then will move switch 61 to the activating position (the "On" position) which will cause drive wheel 60 to be rotated. Switch 61 is connected through the printed circuit board 130. There will also be located a separate acceleration switch (not shown) on the handlebar 18 to increase and decrease the speed of the bicycle 10. This accelerator switch will also be connected to the printed circuit board 130.

The switch 61 can be used to momentarily activate and deactivate the power assist apparatus 28. When the bicycle 10 is coming to a stop sign, deactivation is required. Also deactivation is normally required when going down hills. There may also be mounted on the handlebar 18 a digital readout device (not shown). The digital readout device can be utilized to display different information such as the amount of battery power that is located within the batteries 66 and 70, the number of miles that have been traveled on the batteries, and so forth.

It may be desirable to mount a fender 172 for the tire of support wheel 22 on the housing 116. This can be accomplished by means of a conventional bolt fastener 174. The fender 172 would normally be for aesthetic reasons, but it could also be utilized to assist in eliminating entry of foreign material within the housing 116 as the bicycle 10 is being operated.

What is claimed is:

1. A power assist apparatus for a manually operated vehicle, said manually operated vehicle having a support wheel adapted to engage with a surface on which said manually operated vehicle is to be operated, said power assist apparatus including a drive wheel designed to operationally engage with said support wheel, said drive wheel being operatively driven by a motor assembly, said motor assembly being contained within a housing, the improvement comprising:

a main supporting frame mounted within said housing, said motor assembly and said drive wheel being movably mounted on said main supporting frame between an extended position and a retracted position, said drive wheel and said motor assembly moving together in unison, said extended position being when said drive wheel is engaged with said support wheel, said retracted position being when said drive wheel is spaced from said support wheel;

a handle located exteriorly of said housing, said handle being movable from a first position to a second position, with said handle in said first position said drive wheel being spaced from said support wheel, with said handle in said second position said drive wheel being engaged with said support wheel;

said handle being movable to a third position, said third position more securely engages said drive wheel with said support wheel, whereby said third position is to be used during instances of operating said manually operated vehicle in a wet environment; and said handle being mounted on a mounting rod, said mounting rod being located within said housing, said motor assembly including an output shaft, said drive wheel being mounted on said output shaft, said motor assembly including a motor housing, a clamping ring secured to said motor housing, said clamping ring being fixed to said mounting rod, said mounting rod being pivotally mounted on a mounting bracket, whereby movement of said handle between said first position and said second position and said third position causes pivotal movement of said mounting rod relative to said mounting bracket.

2. The power assist apparatus as defined in claim 1 wherein:

said mounting bracket having a plurality of mounting positions, said mounting rod being connectable with said mounting bracket at any one of said mounting positions thereby permitting adjustment of said mounting rod on said mounting bracket which locates said drive wheel in different positions relative to said support wheel.

3. The power assist apparatus as defined in claim 1 wherein:

there being two in number of motors located within said motor assembly, there being a separate said motor housing for each said motor, there being a separate said clamping ring for each said motor housing, each said clamping ring being fixed to said mounting rod.

4. A power assist apparatus for a manually operated vehicle, said manually operated vehicle having a support wheel adapted to engage with a surface on which said manually operated vehicle is to be operated, said power assist apparatus including a drive wheel designed to operationally engage with said support wheel, said drive wheel being operatively driven by a motor assembly, said motor assembly being contained within a housing, the improvement comprising:

a main supporting frame mounted within said housing, said motor assembly and said drive wheel being movably mounted on said main supporting frame between an extended position and a retracted position, said drive wheel and said motor assembly moving together in unison, said extended position being when said drive wheel is engaged with said support wheel, said retracted position being when said drive wheel is spaced from said support wheel;

means connected to said drive wheel, said means being manually operable for changing the position of said drive wheel between a disengaged position and an engaged position, said disengaged position being when said drive wheel is spaced from said support wheel, said engaged position being when said drive wheel is in physical contact with said support wheel;

said support wheel at least in part being constructed of resilient material so as to be deflectable, said engaged position including a further engagement position that more securely engages said drive wheel with said support wheel by causing said drive wheel to embed to a greater extent within said support wheel which is permitted by said support wheel being deflectable;

said means being movable between a first position and a second position and a third position, with said means in said first position said drive wheel being located in said disengaged position, with said means in said second position said drive wheel being in said engaged position, with said means in said third position said drive wheel being still in said engaged position but located in a different engaged position; and said means including a mounting rod, said mounting rod being located within said housing, said motor assembly including an output shaft, said drive wheel being mounted on said output shaft, said motor assembly including a motor housing, a clamping ring secured to said motor housing, said clamping ring being fixed to said mounting rod, said mounting rod being pivotally mounted on a mounting bracket, whereby movement of said means causes pivotal movement of said mounting rod relative to said mounting bracket.

5. The power assist apparatus as defined in claim 4 wherein:

said mounting bracket has a plurality of mounting positions, said mounting rod being connectable with said mounting bracket at any one of said mounting positions, thereby permitting adjustment of said mounting rod on said mounting bracket which locates said drive wheel at different positions relative to said support wheel.

6. The power assist apparatus as defined in claim 5 wherein:

there being two in number of motors located within said motor assembly, there being a separate said motor housing for each said motor, there being a separate said clamping ring for each said motor housing, each said clamping ring being fixed to said mounting rod.

7. A power assist apparatus for a manually operated vehicle, said manually operated vehicle having a support wheel adapted to engage with a surface on which said manually operated vehicle is to be operated, said power assist apparatus including a drive wheel designed to operationally engage with said support wheel, said drive wheel being operatively driven by a motor assembly, said motor assembly being contained within a housing, the improvement comprising:

a main supporting frame mounted within said housing, said motor assembly and said drive wheel being movably mounted on said main supporting frame between an extended position and a retracted position, said drive wheel and said motor assembly moving together in unison, said extended position being when said drive wheel is engaged with said support wheel, said retracted position being when said drive wheel is spaced from said support wheel;

means connected to said drive wheel, said means being manually operable for changing the position of said drive wheel between a disengaged position and an engaged position, said disengaged position being when said drive wheel is spaced from said support wheel, said engaged position being when said drive wheel is in physical contact with said support wheel; and said means including a mounting rod, said mounting rod being located within said housing, said motor assembly including an output shaft, said drive wheel being mounted on said output shaft, said motor assembly including a motor housing, a clamping ring secured to said motor housing, said clamping ring being fixed to said mounting rod, said mounting rod being pivotally mounted on a mounting bracket, whereby movement of said means causes pivotal movement of said mounting rod relative to said mounting bracket.

8. The power assist apparatus as defined in claim 7 wherein:

said mounting bracket has a plurality of mounting positions, said mounting rod being connectable with said mounting bracket at any one of said mounting positions, thereby permitting adjustment of said mounting rod on said mounting bracket which locates said drive wheel at different positions relative to said support wheel.

9. The power assist apparatus as defined in claim 8 wherein:

there being two in number of said motors located within said motor assembly, there being a separate said motor housing for each said motor, there being a separate said clamping ring for each said motor housing, each said clamping ring being fixed to said mounting rod.

* * * * *